INVENTORS
Walter J. Schrenk,
Kenneth J. Cleereman
and Turner Alfrey, Jr.

INVENTORS
Walter J. Schrenk,
Kenneth J. Cleereman
and Turner Alfrey, Jr.

United States Patent Office 3,127,152
Patented Mar. 31, 1964

3,127,152
COUNTER-ROTATION CONTINUOUS
SHEAR MIXER
Walter J. Schrenk, Bay City, and Kenneth J. Cleereman and Turner Alfrey, Jr., Midland, Mich., assignors to The Dow Chemical Company, Midland, Mich., a corporation of Delaware
Filed Mar. 24, 1961, Ser. No. 98,105
9 Claims. (Cl. 259—6)

This invention relates to an improved method and apparatus for mixing, or interblending miscible viscous liquids into a homogeneous and uniformly merged viscous product.

Briefly, the inventive concept involves the injection of substantially rectangular ribbons of diverse viscous liquids into one end of a cylindrical mixing chamber, which liquids are arranged in alternate sequence to form a circular ribbon-like pattern. The walls of the chamber are adapted for concurrent rotary movement in opposite directions, whereby large interfacial surface areas will be developed in the ribboned liquids which are interblended by shearing action until they become vanishingly thin, as the liquids are moved through the mixing chamber. The two liquids will leave the mixing chamber as a homogeneously and thoroughly interblended liquid mass having uniform viscosity and distribution characteristics.

The present invention differs basically from that disclosed in the copending application of Charles F. Oldershaw and Ralph M. Wiley, Serial No. 674,439, filed July 26, 1957, now Patent 3,008,696, issued November 14, 1961, with respect to the provision for concurrently rotating the mixing chamber walls in opposite directions. Such a provision has been found to produce unexpected improved results, giving under certain conditions, up to one hundred percent of maximum attainable mixing of the liquids.

The main object of this invention is to provide an improved method and apparatus for mixing or interblending miscible viscous liquids into a homogeneous and uniformly merged viscous product.

A more specific object is to provide an improved method and apparatus for mixing or interblending miscible viscous liquids whereby up to one hundred percent of maximum attainable mixing of the liquids is achieved.

These and further objects and features of the invention will become more apparent from the following description and accompanying drawings, wherein.

Figure 1:
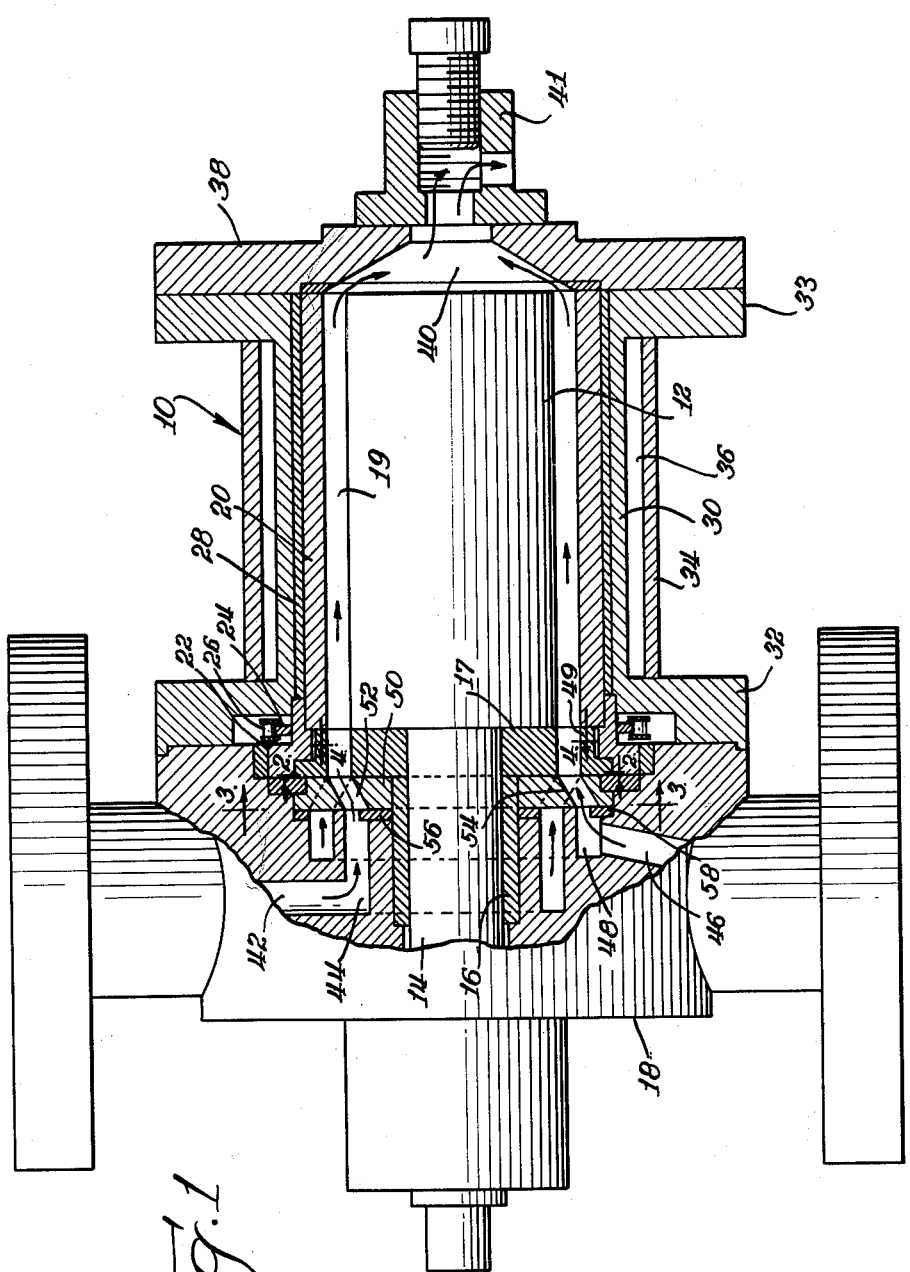
FIG. 1 is a vertical section view through a mixer embodying the principles of the invention.

Referring now to the drawings, numeral 10 identifies a mixer including a smooth external diameter surface internal rotor 12 having a shaft 14, supported in a bushing 16, which is mounted in a feed inlet housing 18. The bushing 16 has a flange 17, the outer end of which abuts the rotor 12. The shaft 14 projects from the housing for connection to a motor means (not shown) whereby the rotor 12 may be rotated within a speed range of 1 to 500 r.p.m. The shaft 14 and rotor 12 are provided with internal passageways (not shown) to receive medium via pipe means (not shown) for heating or cooling the rotor.

Surrounding the rotor 12, and in uniform spaced relation thereto to provide a chamber 19, is a smooth internal diameter surface external rotor 20, which is affixed at one end to a circular drive ring 22 having a plurality of peripherally disposed sprocket teeth 24 arranged for engagement by a drive chain 26. The chain is driven by a motor means (not shown) whereby the rotor 20 may be rotated in a direction opposite that of rotor 12, and within a speed range of 1 to 500 r.p.m. The rotor 20 is supported in a bushing 28, secured within a casing 30 having flanges 32 and 33 at opposite ends.

A barrel, or cylinder 34 surrounds the casing 30 in spaced relation, with the ends abutting the flanges 32 and 33, to thus provide a cylindrical chamber 36 adapted to receive medium via pipe means (not shown) for heating or cooling the external rotor 20. An end plate 38 is secured to flange 33, and has a recess 40 opening into a discharge valve 41, whereby flow of mixed material from the mixing chamber 19 may be regulated.

Figure 2:
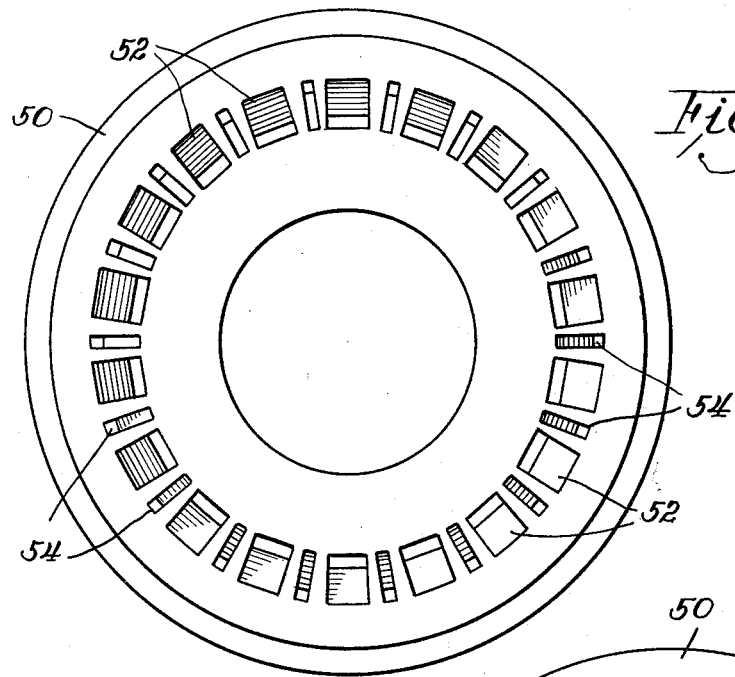
FIG. 2 is a view generally as seen from line 2—2 in FIG. 1.
Figure 3:
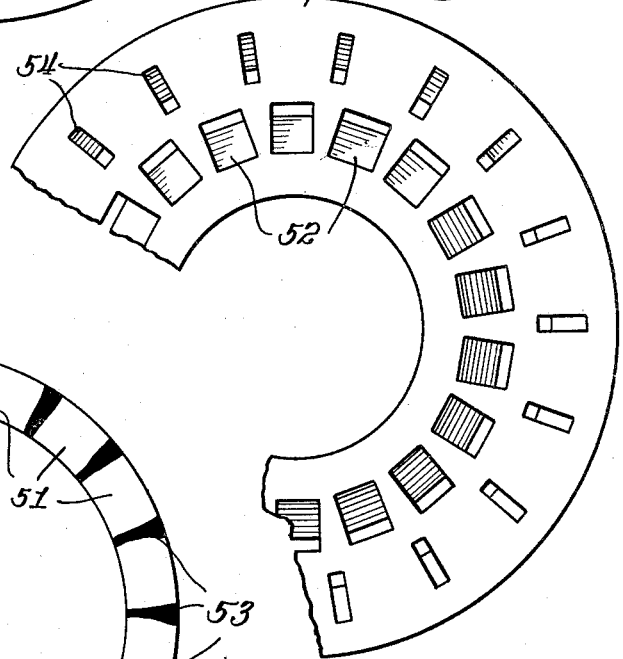
FIG. 3 is a view generally as seen from line 3—3 in FIG. 1.
Figure 4:
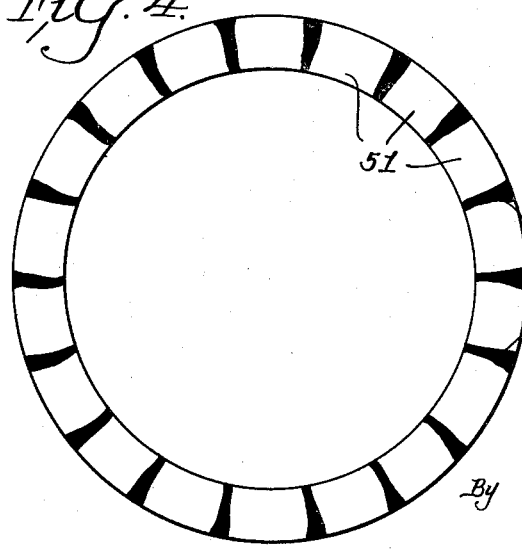
FIG. 4 is a view generally as seen from line 4—4 in FIG. 1.

The housing 18 is formed to provide a first passageway 42 which opens into a cylindrical recess 44, and a second passageway 46 opening into a cylindrical recess 48 which extends about the recess 44 and in uniform spaced relation thereto. The axis of each cylindrical recess 44 and 48, coincides with the longitudinal axis of the internal rotor 12. An interdistributing element 50, which is disc-like in form, is positioned in the housing 18, so that one side encloses the open ends of the recesses 44 and 48. The interdistributing element 50 is formed to provide a plurality of circularly arranged, rectangular openings, or feed ports, a first set 52 being sloped, or canted to interconnect the cylindrical recess 44 and the mixing chamber 19, and a second set 54 being sloped, or canted to interconnect the cylindrical recess 48 and the mixing chamber 19. As best seen in FIG. 2, the feed ports 52 and 54, are arranged in alternate sequence so that the material flowing therethrough will enter the mixing chamber 19 as ribbon-like layers to form a toroidal (i.e., an annular, multilayer) sandwich. In other words, material 51 flowing from the recess 44 will be interposed in a uniform and repetitive manner between material 53 flowing from the recess 48, as illustrated in FIG. 4. A non-rotating ring-like element 49 is preferably arranged between the interdistributing element 50 and the external rotor 20, which provides a "dead space" allowing polymer flow to combine and adjust itself to axial velocity profile before being subjected to shear.

The number and dimensions of the feed ports 52 and 54, as well as other structural dimensions, will depend upon various factors, such as material flow rate, types and characteristics of materials being mixed, pressures being utilized, etc., and may be established in any given case by application of well known design techniques. For example, in the apparatus illustrated, there were eighteen feed ports in set 52 for discharge of a white polymer 51, and eighteen feed ports in set 54 for discharge of a black polymer 53, the latter feed ports being approximately one-ninth as wide as the former feed ports. Material feeders (not shown) were set to supply 36 lbs./hr. of white polymer and 4 lbs./hr. of black polymer, i.e., 90% white, and 10% black, to the passageways 42 and 46 respectively. The feed ports 52 and 54 were balanced with pressure equalizing circular masks 56 and 58 respectively, so that the flow would be uniform through each port. The polymers being mixed were heated to approximately 450° F. and maintained at that temperature during mixing, while the pressure applied to the polymers was within a range of 250 to 280 p.s.i. The internal rotor 12 was approximately 6¾ inches long with a 3.3 inch O.D., while the external rotor was of equivalent length with a 4 inch I.D.

The following table sets forth data gathered during operation of apparatus as above described:

| Speed of Rotation of Rotors (r.p.m.) | | Ratio of Rotor Speed | Mixing Efficiency* |
|---|---|---|---|
| Rotor 12 | Rotor 20 | | |
| 0 | 100 | 0 | 25 |
| −10 | 90 | −.11 | 75 |
| −20 | 80 | −.25 | 85 |
| −50 | 50 | −1.0 | 100 |

*Percent of maximum attainable mixing.

It will be seen from the data developed under actual test, that mixing efficiency increases as the speed of the rotors, rotating in opposite directions, approach equivalent values. It follows, that the counter-rotation of inner and outer wall surfaces of a cylindrical mixing chamber (which wall surfaces define a first and second common boundary for the liquids moving through the chamber) for interblending a plurality of polymers, will result in significant improvement in mixing efficiency. While the method and apparatus has been described with respect to mixing two liquids, any number of liquids may be mixed utilizing the basic concept of the invention, with equally effective results.

The foregoing description has been given in detail without thought of limitation, since the inventive principles involved are capable of assuming other forms without departing from the spirit of the invention and accompanying claims.

What is claimed is:

1. A method for mixing a plurality of diverse miscible viscous liquids comprising the steps of, arranging said liquids in a ribbon-like pattern having an alternate repetitive sequence, and moving the liquids along a longitudinal path while applying a first liquid moving force along a first common boundary of the liquids, and a second liquid moving force along a second common boundary of the liquids, said first and second forces being applied in unlike directions.

2. A method for mixing a plurality of diverse miscible viscous liquids comprising the steps of, arranging a plurality of said liquids in a ribbon-like pattern having an alternate repetitive sequence, and moving the liquids along a longitudinal path while applying a first liquid moving force along a first common boundary of the liquids and normal to the direction of movement of the liquids, and a second liquid moving force along a second common boundary of the liquids and normal to the direction of movement of the liquids, said first and second forces being applied in opposite directions.

3. A method for mixing a plurality of diverse miscible viscous liquids comprising the steps of, arranging said liquids in a circular ribbon-like pattern having an alternate repetitive sequence, and moving the liquids along a longitudinal path while applying a first liquid moving force along the minimum diameter surface, and a second liquid moving force along the maximum diameter surface, said first and second moving forces being applied in opposite directions.

4. A method for mixing a plurality of diverse miscible viscous liquids comprising the steps of arranging the liquids to form an annular multilayer sandwich with the liquids in an alternate repetitive sequence, moving the liquids along a longitudinal path while applying a first liquid moving force along the minimum diameter surface and normal to the direction of movement of the liquids, and a second liquid moving force along the maximum diameter surface and normal to the direction of movement of the liquids, said first and second moving forces being applied in opposite directions, and collecting the liquids after they have been interblended by such action into a homogeneous and uniformly merged viscous product.

5. A method for mixing a plurality of diverse miscible viscous liquids according to claim 4, wherein said liquids are polymeric compositions.

6. Apparatus for blending diverse, viscous liquids, comprising a mixing chamber having open ends and defined by an internal rotor and an external rotor spaced from the internal rotor, means to introduce a plurality of said liquids into one end of the mixing chamber, which liquids are arranged in an alternate repetitive sequence, and means for concurrent rotation of said rotors in opposite directions as the liquids are moved through the mixing chamber.

7. Apparatus for blending diverse viscous liquids comprising, a mixing chamber having open ends and defined by an internal rotor and an external rotor spaced uniformly about the internal rotor, an interdistributing element at one end of the mixing chamber said element having a plurality of radial juxtaposed slots for injecting said liquids into the mixing chamber in an alternate and repetitive sequence, an outlet flow control valve at the other end of the mixing chamber, and means for concurrent rotation of said rotors in opposite directions as the liquids are moved through the mixing chamber.

8. Apparatus according to claim 7, wherein the rotors are driven at the same rotational speed.

9. Apparatus according to claim 7, wherein a nonrotational dead-space is provided between the interdistributing element and the rotors.

References Cited in the file of this patent

UNITED STATES PATENTS

| 1,935,884 | Loomis et al. | Nov. 21, 1933 |
| 2,474,006 | Maycock | June 21, 1949 |
| 2,547,151 | Braeseke | Apr. 3, 1951 |

FOREIGN PATENTS

| 1,233,531 | France | May 9, 1960 |